(12) United States Patent
Rettenberger et al.

(10) Patent No.: US 6,243,512 B1
(45) Date of Patent: Jun. 5, 2001

(54) OPTICAL 2-FIBER RING NETWORK

(75) Inventors: Stephan Rettenberger; Uwe Fischer, both of Munich; Horst Schukat, Gruenwald, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/342,366

(22) Filed: Jun. 29, 1999

(30) Foreign Application Priority Data

Jun. 29, 1998 (DE) .............................. 198 28 973

(51) Int. Cl.$^7$ ...................................... G02B 6/26
(52) U.S. Cl. ................................ 385/24; 385/32
(58) Field of Search ................. 385/24, 32, 15

(56) References Cited

U.S. PATENT DOCUMENTS 5,701,372 * 12/1997 Magel et al. ............................ 385/24
6,052,495 * 4/2000 Little et al. ................................ 385/2
6,108,465 * 8/2000 Iida et al. ................................ 385/15

FOREIGN PATENT DOCUMENTS 0 651 528 A1   10/1993   (EP) .
0 651 529 A1   10/1993   (EP) .
0 716 521 A2   12/1995   (EP) .

OTHER PUBLICATIONS

Abstract, EP 651528, Oct. 29, 1993, Huber et al.
Abstract, EP 651529, Oct. 29, 1993, Huber et al.
Multiwavelength Survivable Ring Network Architectures, A.F. Elrefaie, pp. 1245–1251; 1993; IEEE.
First Results of an experimental Coloured Section Ring, Hamel et al., pp. 3.51–3.54; 22$^{nd}$ European Conference on Optical Communication, 1996.

* cited by examiner

*Primary Examiner*—Hung N. Ngo
(74) *Attorney, Agent, or Firm*—Bell, Boyd & Lloyd LLC

(57) ABSTRACT

An optical 2-fiber ring network having multiple terminals and two unidirectional data rings. The connection between two of the terminals occurs via respectively one ring given a non-malfunctioning mode. Given a malfunctioning of a line, protection channels are provided that respectively exhibit the same wavelength as the previous working channels.

5 Claims, 5 Drawing Sheets

OPTICAL 2-FIBER RING NETWORK

BACKGROUND OF THE INVENTION

1. Field of the Invention

The present invention relates to an optical 2-fiber ring network for wave-division multiplex systems with several add-drop-multiplexer-terminals.

2. Description of the Prior Art

Optical networks are frequently conceived as ring networks in order to have an alternate path available when malfunctions of the regular transmission path occur. The article Multiwavelength Survivable Ring Network Architectures, A. F. Elrefaie, Bellcore, Red Bank, N.J. 07701, USA, 0-7803-0950-2/93/$3.001993IEEE, pages 1245 through 1251 discloses such ring architectures for a wavelength-division multiplex system.

The ring networks are frequently provided with what is referred to as add-drop multiplexers that serve the purpose of branching and inserting transmission channels. Previously, these functions were performed by electrical signals. In the future, optically working switching matrixes, however, are supposed to take over these functions. These optically working switching matrixes are inserted into ring structures, are realized with small outlay and exhibit protection circuits (alternate circuits).

SUMMARY OF THE INVENTION

A particular advantage of the ring network of the present invention is that a specific wavelength is allocated to each line assembly (allocated to a participant) not only for the outgoing signals but also for the received signals. This wavelength is retained for the transmission not only in the working channels of the ring network but also in the protection channels. The switching between non-malfunctioning and protection mode occurs via simple optical circuit means.

Accordingly, in an embodiment of the present invention, a 2-fiber ring network is provided which has a plurality of terminals for branching and inserting a plurality of data channels, wherein the 2-fiber rings are formed as first and second optical fiber rings and have opposite unidirectional transmission paths, and which further includes: a first transmission band wherein a first group of data channels from the plurality of data channels is allocated to the first transmission band and transmitted in the first optical fiber ring, each of the data channels in the first group having a same wavelength; a second transmission band wherein a second group of data channels from the plurality of data channels is allocated to the second transmission band and transmitted in the second optical fiber ring, each of the data channels in the second group having a same wavelength; and a plurality of optical switches wherein, upon a transmission path malfunction in one of the two optical fiber rings, working data channels from the malfunctioning optical fiber ring are inserted, via the optical switches and the plurality of terminals, as protection channels into the other optical fiber ring and retain their respective wavelengths.

In an embodiment, given a transmission path malfunction in both of the optical fiber rings between certain of the plurality of terminals, the working data channels are redirected via other terminals to the other optical fiber ring.

In an embodiment, each optical fiber ring has a separate switching matrix.

In an embodiment, the network further includes a plurality of line multiplexers for combining the working channels and the protection channels to form multiplex signals to be emitted; and a plurality of line demultiplexers for receiving the multiplexing signals and for separating the working channels and the protection channels.

In an embodiment, the network further includes a plurality of wavelength demultiplexers for outputting data channels to the switching matrix, the plurality of wavelength demultiplexers having inputs connected to outputs of the plurality of line multiplexers via the optical switches; and a plurality of wavelength multiplexers provided with data channels from the switching matrix, the plurality of wavelength multiplexers having outputs connected to inputs of the plurality of line multiplexers via the optical switches.

Additional features and advantages of the present invention are described in, and will be apparent from, the Detailed Description of the Preferred Embodiments and the Drawing.

DETAILED DESCRIPTION OF THE PREFERRED EMBODIMENTS

Figure 1:
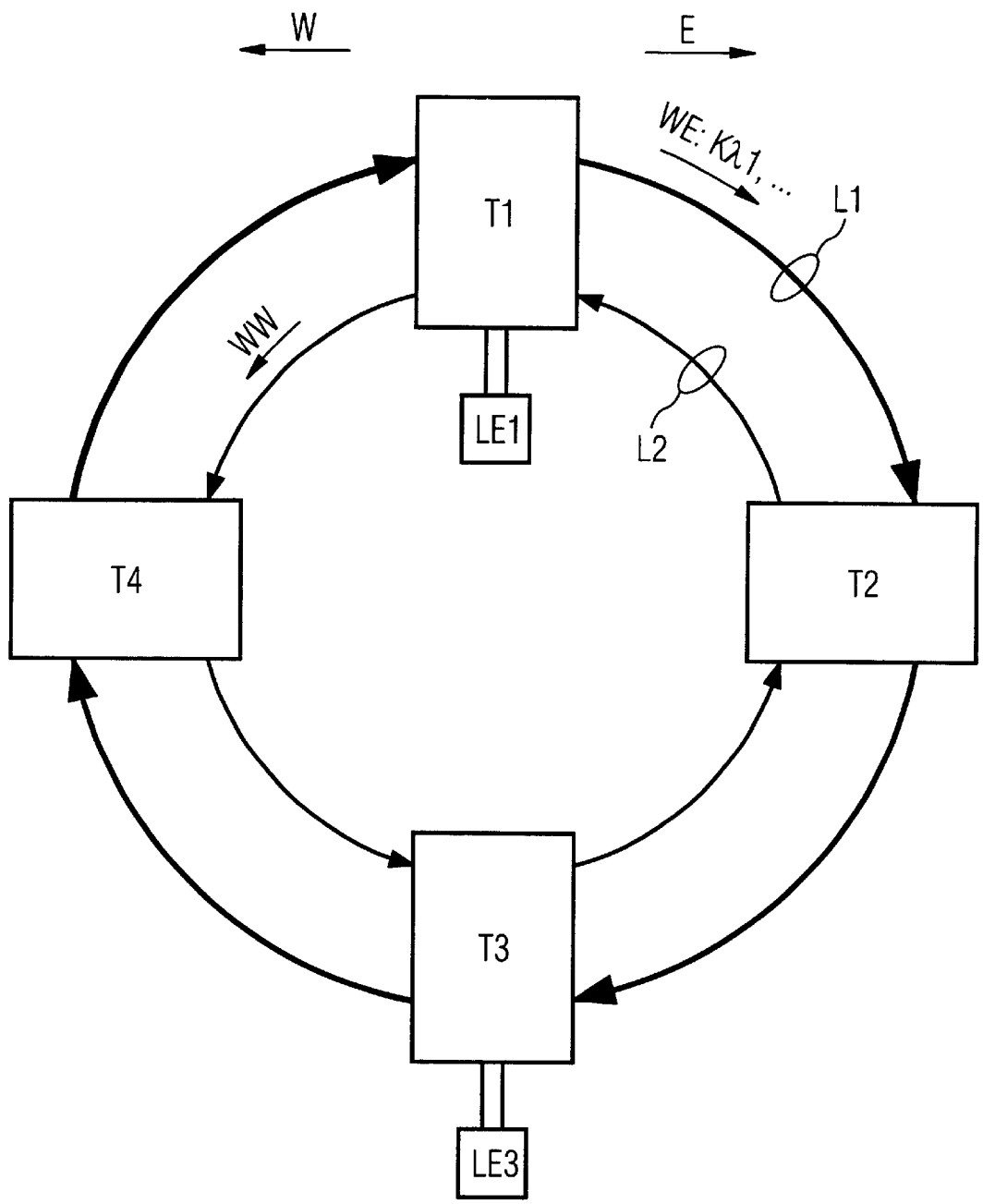
FIG. 1 shows the principle of the ring network of the present invention.

FIG. 1 illustrates a ring network with two optical fibers L1 and L2. The working connections between the terminals occur via a variety of working channels WW and WE, which are respectively allocated to a specific wavelength. Terminal T3, for example, receives data of terminal 1 via one of the working channels east WE, the data channel Kλ1. Terminal T1, for example, receives data of terminal T3 via the other part of the ring section via the "same" data channel Kλ1 (the same wavelength is used for the transmission of other data), uncouples these and sends new data to terminal T2 in the same data channel. This data channel is respectively looped through the terminals T2 and T4 that are not affected by the data transmission. Data is correspondingly transmitted in the opposite direction via working channels west WW. Therewith, the terminals are connected with each other by two unidirectional rings. Each line terminal device that is connected to a terminal, LE1 and LE31 for example (several line terminal devices are mostly connected), is consequently connected with a different line terminal device via one of the two rings. Via further channels that are respectively allocated to different wavelengths, further terminals or line terminal devices are connected with each other via the first optical fiber L1 as well as via the second line terminal device L2.

The working channels WE that are transmitted by the first optical fiber L1 are allocated to a first, higher "blue" transmission band and exhibit smaller wavelengths, whereas the channels WW that are transmitted via the second optical fiber L2 exhibit longer wavelengths and are allocated to a second "red" transmission band. Transmission bands wherein the individual channels are nested in terms of wavelengths are also conceivable (but not very expedient).

Figure 2:
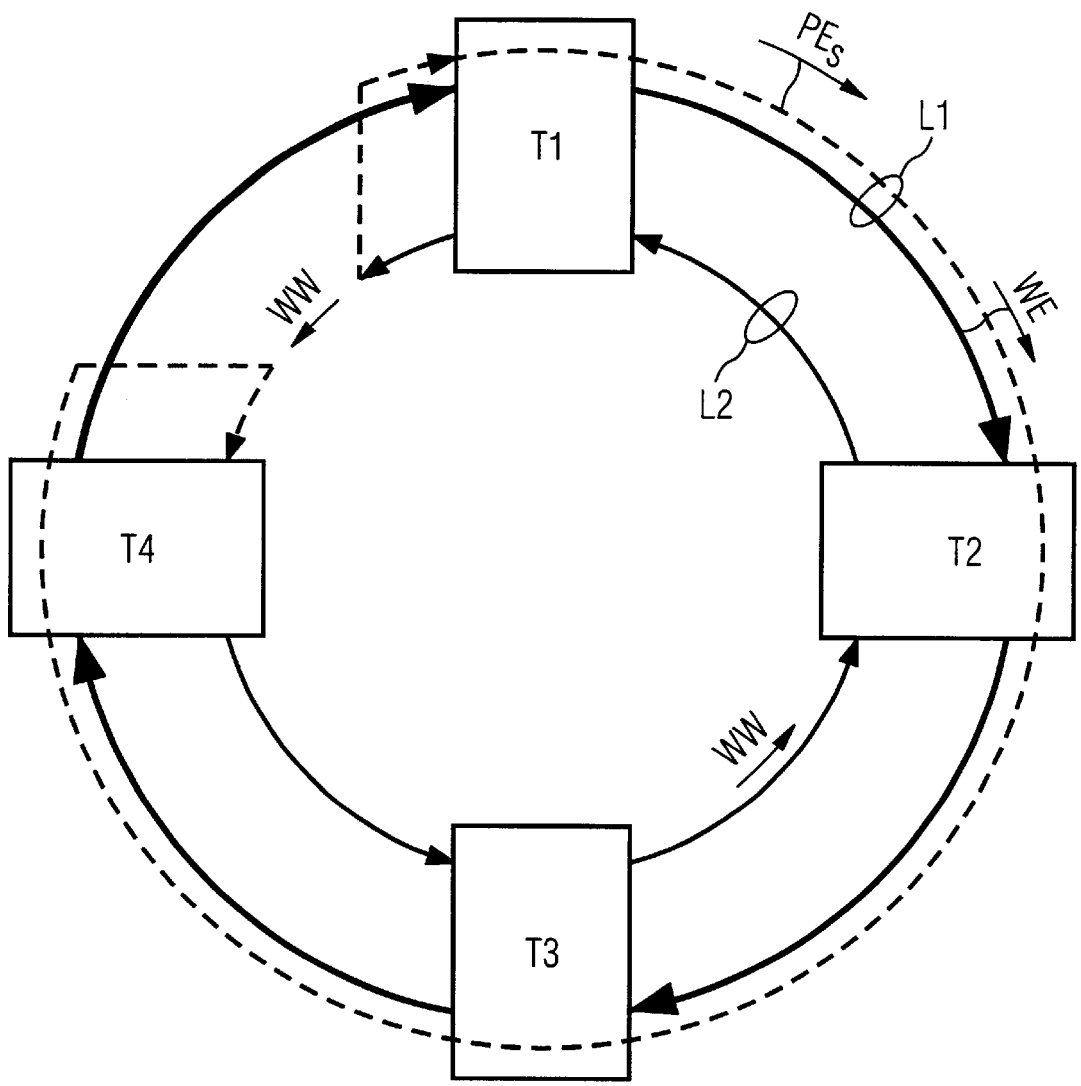
FIG. 2 shows the transmission paths given an interrupted optical fiber.

The second optical fiber L2 is broken between terminal T1 and terminal T4 in FIG. 2. The protection connection (alternate connection) that includes all of the channels that are transmitted to the optical fiber 2 is switched via the first optical fiber L1 and the intact part of the ring to terminal T4. The working channels WW previously emitted counter-clockwise from terminal 1 in the red transmission band in the direction of west W are now redirected and supplied into the first optical fiber L1 as protection channels $PE_s$ and continue to be transmitted in the red transmission band via the intact part of the ring network, this ensuing clockwise this time. Since the red transmission band on the optical fiber L1 was previously free, the data that are additionally transmitted to the red transmission band do not collide with the data of the blue transmission band. The red transmission band is looped through the terminals T2 and T3. In order to preserve the clarity of the illustration, the alternate circuit in FIG. 2 was only illustrated for one channel that transports data for terminal T4. The remaining channels are supplied in turn into the red transmission band WW via terminal T4. The indicies "s" that are used as a supplement of the reference characters serve the purpose of designating that these signals are emitted as protection signals.

Figure 3:
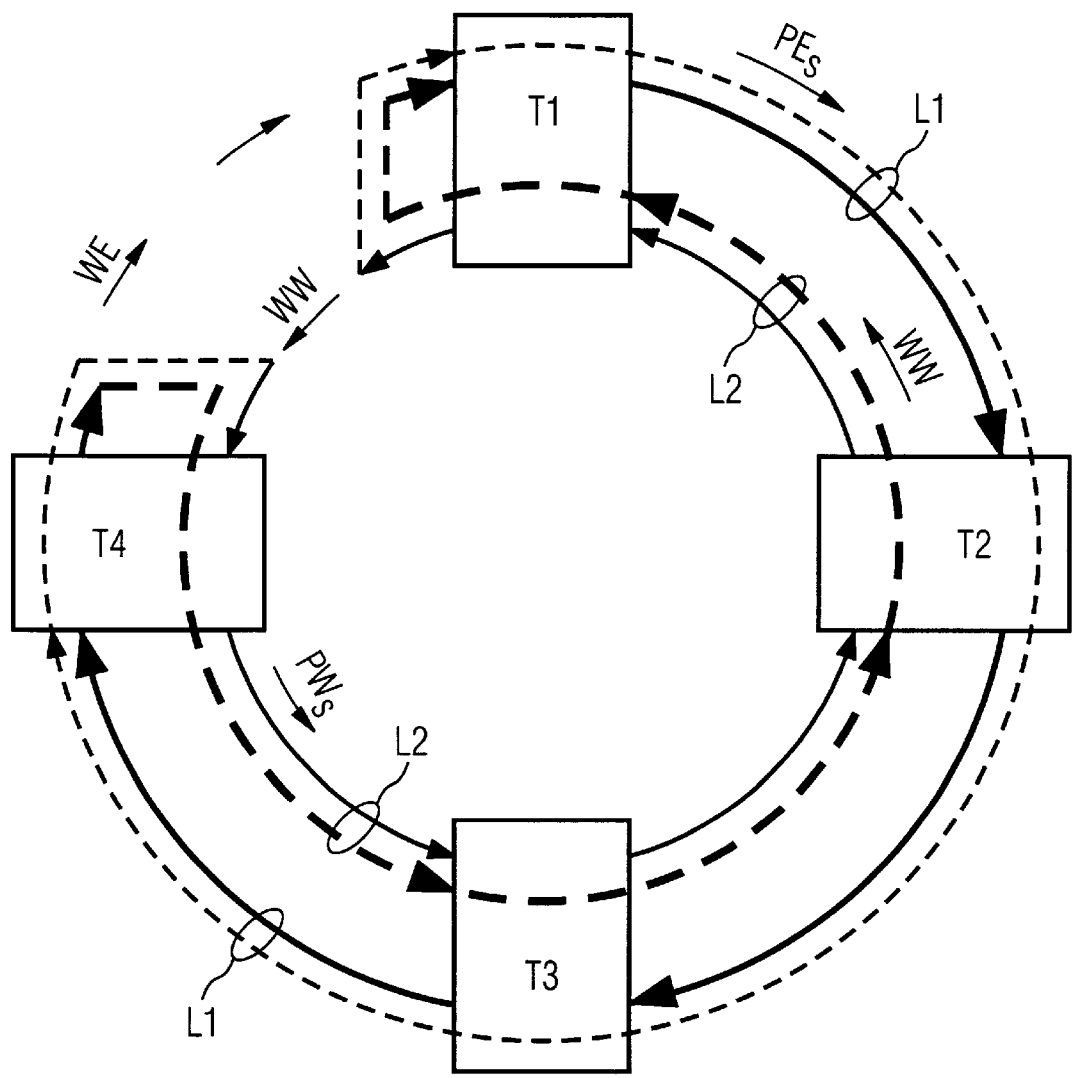
FIG. 3 shows the transmission paths given two interrupted optical fibers.

FIG. 3 illustrates the case that both optical fibers L1 and L2 are interrupted (malfunctioning) between the terminals T1 and T4. The working channels WW and WE that can no longer be transmitted via this link are respectively redirected and supplied into the other optical fiber as protection channels $PE_s$ and $PW_s$, and they are transmitted via the intact part of the ring network wherein they are looped through the terminals T2 and T3.

Figure 4:
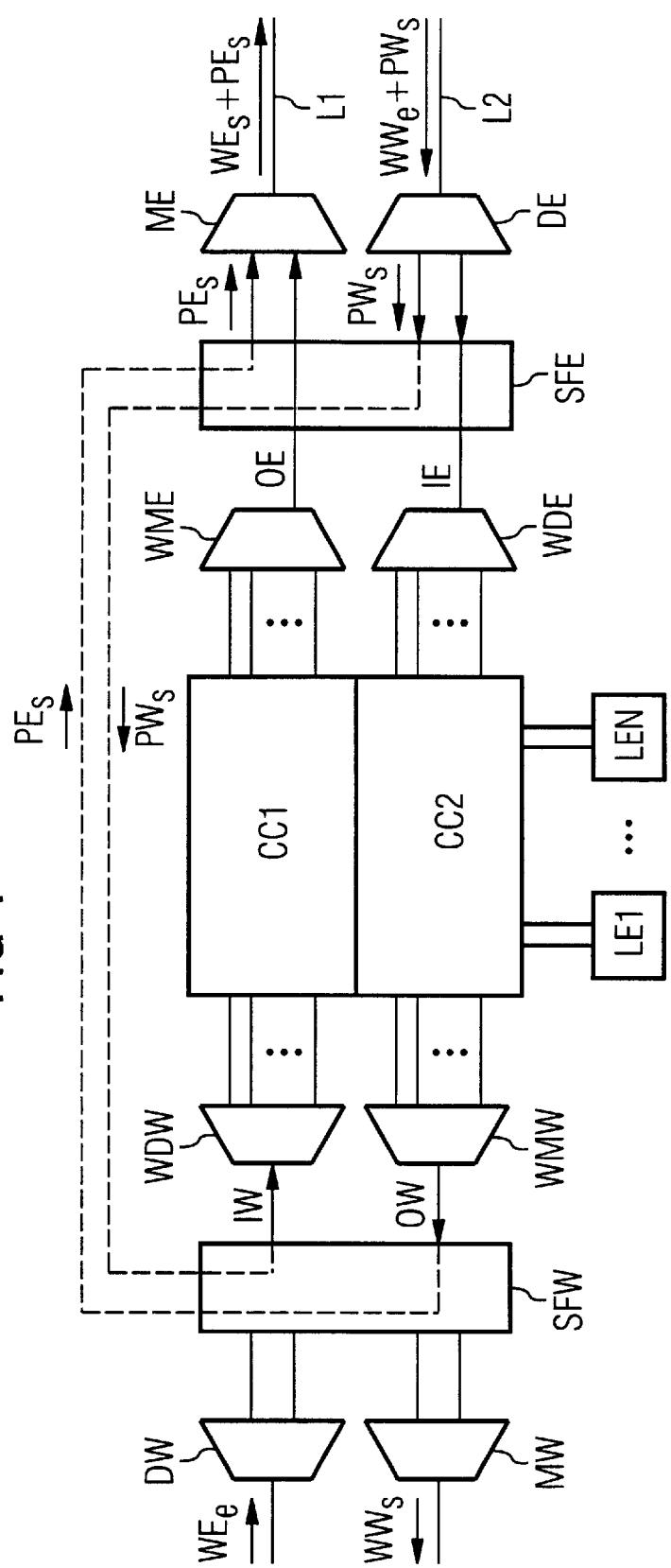
FIG. 4 shows the schematic diagram of a terminal of the present invention.

FIG. 4 shows a schematic diagram of terminal T1. It contains two switching matrixes, CC1 and CC2, which respectively receive a wavelength multiplex signal, the working channels $WW_e$, or respectively $WE_e$ given a non-malfunctioning operation. The switching matrixes, CC1 and CC2 also respectively emit a wavelength multiplex signal $WW_s$ or $WE_s$ (e is additionally added as an index for the received signals; however, the signals correspond with the signals that are previously provided with the otherwise same reference characters).

The received multiplex signals are initially divided in line demultiplexers DE and DW into working channels $WW_e$ or, respectively, $WE_e$ and protection channels $PW_e(PE_e)$, which are respectively supplied to an optical patch board SFE (SFW). The working channels or protection channels, $WW_e$ or $PW_e$ for example, are supplied to a wavelength demultiplexer WDE (WDW) and are divided into different channels with different wavelengths by the wavelength demultiplexer.

Given a non-malfunctioning mode, the individual channels are either switched through by the switching matrixes CC1, CC2 or branched at line terminal devices LE1, . . . , LEN. The signals that are output by the line terminal devices are combined to wavelength multiplex signals and are emitted in the same way via the switching matrixes in wavelength multiplexers MW and ME.

The signals of each line terminal device that are to be branched and inserted are only through-connected in one switching matrix. However, if, as in FIG. 3, the western connections of terminal T1 are malfunctioning, the working signals $WW_s$ that are to be emitted in the direction W via the output OW of the switching matrix CC2 must then be coupled into the optical fiber L1 as protection signals $PE_s$ via the patch board SFW and the patch board SFE via the output OE of a line multiplexer east ME.

Due to the malfunction, signals $WE_e$ can no longer be received from the direction W. However, corresponding to FIG. 3, these reception signals are emitted from terminal T4 as protection signal $PW_s$ and arrive at a line demultiplexer DE via the optical fiber L2 via the non-malfunctioning ring segment. From there, they are conducted via the patch boards SFE and SFW to the input IW of the wavelength demultiplexer WDW at which the identical working signals were previously received (the designation of the inputs and outputs of the remaining wavelength demultiplexers and wavelength multiplexers is chosen correspondingly). The protection connections are illustrated with broken lines.

As can be seen from FIG. 4, the line multiplexers and wavelength multiplexers, or respectively, the line demultiplexers and wavelength demultiplexers can basically also be combined respectively, and the patch boards can be realized as part of the switching matrix.

Figure 5:
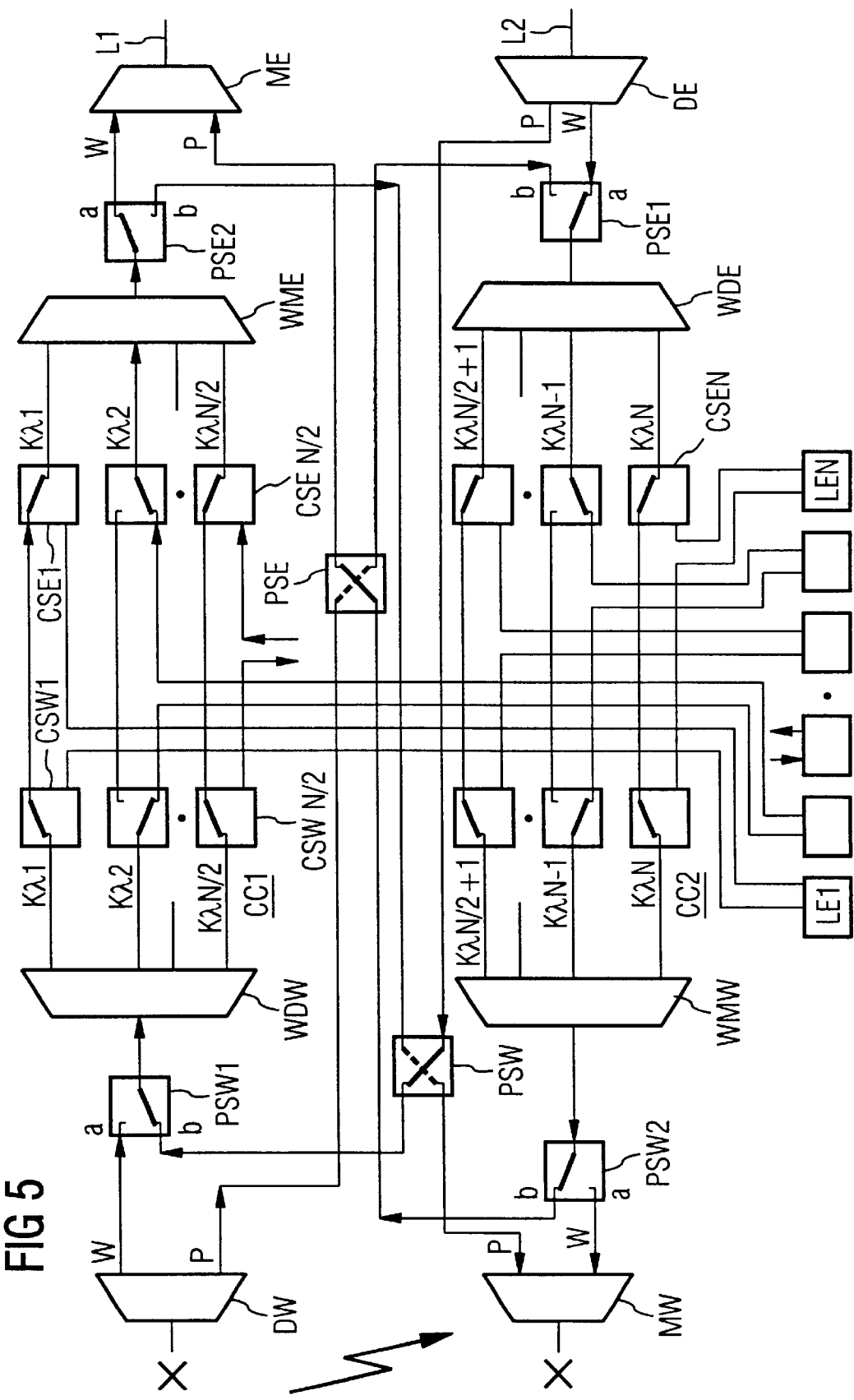
FIG. 5 shows an exemplary embodiment of a terminal.

FIG. 5 shows critical details of the terminal. Either the working outputs W of the line multiplexers DW and DE or the protection outputs P of the line multiplexer DE or, respectively, DW can be combined with the input of the wavelength demultiplexer west WDW or, respectively, the demultiplexer east WDE via protection switches PSW1, PSE1 and PSW, PSE (parts of the patch board SFW). This allows for the realization of a protection circuit at the reception side. The wavelength demultiplexer west WDW divides the wavelength multiplex signal that has been supplied to it into different channels $K\lambda 1$ through $K\lambda_{N/2}$. The wavelength multiplex signal always corresponds, not only as working signal but also as protection signal, with the same transmission band (blue here). Optical switches CSW1 through $CSW_{N/2}$ of the switching matrix CC1 enable the through-switching of the individual channel to further optical switches CSE1 through $CSE_{N/2}$ whose outputs are connected to the wavelength multiplexer east WME and are here combined to a wavelength multiplexer signal that is to be emitted. Instead of the through-switching of the channels $K\lambda$ through $KA\lambda_{N/2}$, the optical switches CSW1 through $CSW_{N/2}$ of the switching matrix CC1 also enable their branching (drop-function), whereas the switches CSE1 through $CSE_{N/2}$ enable the inserting (add-function) of corresponding channels or, respectively, signals of the line terminal assemblies LE1 through $LE_{N/2}$ instead of the through-switching function.

FIG. 5 shows a malfunction of the western lines so that the wavelength demultiplexer WDW is supplied with the protection signal. For the realization of the protection function, the output of the wavelength multiplexer east WME can be connected to a protection input of the line multiplexer MW via protection switches PSE2 and PSW; this does not correspond with the illustrated malfunction. In the same way, the outputs of the wavelength demultiplexer east WDE are connected to further switches $CSE_{N/2}+1$ through $CSE_N$ that serve the purpose of the through-switching of the channels $K\lambda_{N/2+1}$ through $K\lambda_N$, or their branching (drop function). The inserting or through-switching occurs with further switches $CSW_{N/2+1}$ through $CSW_N$ whose outputs are combined by a wavelength multiplexer WMW whose output is connected to the line multiplexer west MW via a protection switch PSW2 or, in the illustrated malfunction, is connected to the line multiplexer ME via this switch and the further protection switch PSE. Via switch PSE, the protection signal is through-switched in terminals that are not affected. In a similar fashion, given the non-malfunctioning mode of the eastern lines, the output of the wavelength multiplexer east WME is connected to the line multiplexer ME via the protection switch PSE2 or the output of the wavelength multiplexer east WME is conducted on the line multiplexer west MW via the protection switch PSE2 and a further protection switch PSW given line malfunctions east of the terminal.

The positions of the protection switches for malfunctions at the westside of both fibers L1 and L2 are shown. In this case, all connections must be conducted via the optical fibers that are connected in the east to the terminal. The wavelength multiplex signal that is to be emitted in the direction west is connected to an input of the line multiplexer east ME via the protection switch PSW2 and the protection switch PSE, and is emitted as protection signal PE via the first optical fiber L1.

Since the line demultiplexer west DW cannot receive a signal, it can only be received via the eastern path, i.e. via the second optical fiber L2, and it can be supplied to the wavelength demultiplexer west WDW as protection signal via the protection switch PSE1 and PSW. The protection switches PSE and PSW can also be realized as part of the switching matrix.

Although the present invention has been described with reference to specific embodiments, those of skill in the art will recognize that changes may be made thereto without departing from the spirit and scope of the invention as set forth in the hereafter appended claims.

We claim as our invention:

1. A 2-fiber ring network having a plurality of terminals for branching and inserting a plurality of data channels, wherein the 2-fiber rings are formed as first and second optical fiber rings and have opposite unidirectional transmission paths, the network comprising:

a first transmission band wherein a first group of data channels from the plurality of data channels is allocated to the first transmission band and transmitted in the first optical fiber ring, each of the data channels in the first group having a same wavelength;

a second transmission band wherein a second group of data channels from the plurality of data channels is allocated to the second transmission band and transmitted in the second optical fiber ring, each of the data channels in the second group having a same wavelength; and a plurality of optical switches wherein, upon a transmission path malfunction in one of the two optical fiber rings, working data channels from the malfunctioning optical fiber ring are inserted, via the optical switches and the plurality of terminals, as protection channels into the other optical fiber ring and retain their respective wavelengths.

2. A 2-fiber ring network as claimed in claim 1, wherein, given a transmission path malfunction in both of the optical fiber rings between certain of the plurality of terminals, the working data channels are redirected via other terminals to the other optical fiber ring.

3. A 2-fiber ring network as claimed in claim 1, wherein each optical fiber ring has a separate switching matrix.

4. A 2-fiber ring network as claimed in claim 1, further comprising:

a plurality of line multiplexers for combining the working channels and the protection channels to form multiplex signals to be emitted; and a plurality of line demultiplexers for receiving the multiplex signals and for separating the working channels and the protection channels.

5. A 2-fiber ring network as claimed in claim 4, further comprising:

a plurality of wavelength demultiplexers for outputting data channels to the switching matrix, the plurality of wavelength demultiplexers having inputs connected to outputs of the plurality of line multiplexers via the optical switches; and a plurality of wavelength multiplexers provided with data channels from the switching matrix, the plurality of wavelength multiplexers having outputs connected to inputs of the plurality of line multiplexers via the optical switches.

* * * * *